United States Patent
Danilov et al.

(10) Patent No.: US 11,816,065 B2
(45) Date of Patent: Nov. 14, 2023

(54) EVENT LEVEL RETENTION MANAGEMENT FOR DATA STREAMS

(71) Applicant: EMC IP Holding Company LLC, Hopkinton, MA (US)

(72) Inventors: Mikhail Danilov, Saint Petersburg (RU); Andrei Paduroiu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 277 days.

(21) Appl. No.: 17/145,588

(22) Filed: Jan. 11, 2021

(65) Prior Publication Data

US 2022/0222206 A1 Jul. 14, 2022

(51) Int. Cl.
*G06F 16/11* (2019.01)
*H04N 21/845* (2011.01)
*G06F 3/06* (2006.01)

(52) U.S. Cl.
CPC ............ *G06F 16/125* (2019.01); *G06F 3/067* (2013.01); *H04N 21/8456* (2013.01)

(58) Field of Classification Search
CPC .... G06F 16/125; G06F 3/067; H04N 21/8456
See application file for complete search history.

(56) References Cited

U.S. PATENT DOCUMENTS

| | | |
|---|---|---|
| 3,617,587 A | 11/1971 | Nayar et al. |
| 5,826,977 A | 10/1998 | Fowler et al. |
| 7,107,419 B1 | 9/2006 | Ghemawat et al. |
| 7,340,690 B2 | 3/2008 | Lau |
| 7,430,570 B1 | 9/2008 | Srinivasan et al. |

(Continued)

FOREIGN PATENT DOCUMENTS

| | | |
|---|---|---|
| CA | 2 534 170 A1 | 7/2007 |
| CA | 2672879 | 4/2008 |

(Continued)

OTHER PUBLICATIONS

Non-Final Office Action received for U.S. Appl. No. 17/063,906, dated Oct. 27, 2022, 59 pages.

(Continued)

*Primary Examiner* — Zi Ye
*Assistant Examiner* — Xiang Yu
(74) *Attorney, Agent, or Firm* — Amin, Turocy & Watson, LLP

(57) ABSTRACT

The described technology is generally directed towards fine-grained data retention management in stream-based data storage systems, which facilitates specifying retention policy at the event level. A fixed retention period corresponding to a retention end time is associated with each event, and the system keeps the longest of the retention end times for each segment of a data stream. Stream cuts are generated which divide the data stream into fragments, and are the basis for truncating the data stream. Each stream cut contains a stream cut retention end time obtained from the longest retention end time of the retention end times of the active segments. When an attempt to truncate a data stream from a stream cut is made, the attempt is blocked if the stream cut's retention end time is in the future, otherwise truncation from the stream cut point is allowed to proceed.

20 Claims, 12 Drawing Sheets

(56) References Cited

U.S. PATENT DOCUMENTS

| | | | |
|---|---|---|---|
| 7,610,437 B2 | 10/2009 | Sinclair et al. |
| 7,769,717 B2 | 8/2010 | Federwisch et al. |
| 7,984,084 B2 | 7/2011 | Sinclair |
| 8,285,918 B2 | 10/2012 | Maheshwari |
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,825,848 B1 | 9/2014 | Dotan et al. |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1 | 8/2016 | Kulkarni |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer et al. |
| 9,715,434 B1 | 7/2017 | Xu et al. |
| 9,734,050 B2 | 8/2017 | Sinclair et al. |
| 9,734,911 B2 | 8/2017 | Sinclair et al. |
| 9,753,932 B1 | 9/2017 | Brow et al. |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,338,834 B1 | 7/2019 | Dighe et al. |
| 10,338,958 B1 | 7/2019 | Kamboj et al. |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1 | 12/2020 | Evenson et al. |
| 10,867,033 B2 | 12/2020 | Keren et al. |
| 10,891,228 B2 | 1/2021 | Steinmacher-Burow |
| 10,909,174 B1 | 2/2021 | Martin et al. |
| 10,983,715 B2 | 4/2021 | Sharoni et al. |
| 11,016,826 B2 | 5/2021 | Lehmann |
| 11,086,537 B2 | 8/2021 | Byun |
| 11,194,638 B1 | 12/2021 | Danilov et al. |
| 11,314,779 B1 | 4/2022 | Jain |
| 11,354,054 B2 | 6/2022 | Danilov et al. |
| 2004/0199524 A1 | 10/2004 | Rys et al. |
| 2005/0025152 A1 | 2/2005 | Georgiou et al. |
| 2005/0055519 A1 | 3/2005 | Stuart et al. |
| 2006/0036568 A1 | 2/2006 | Moore et al. |
| 2006/0058987 A1 | 3/2006 | Kumar et al. |
| 2007/0033325 A1 | 2/2007 | Sinclair et al. |
| 2007/0047635 A1 | 3/2007 | Stojanovic et al. |
| 2007/0220518 A1 | 9/2007 | Verbowski et al. |
| 2008/0059724 A1 | 3/2008 | Stifter, Jr. |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1 | 7/2009 | Rohit et al. |
| 2010/0077013 A1 | 3/2010 | Clements et al. |
| 2010/0083098 A1 | 4/2010 | Leme et al. |
| 2010/0088296 A1 | 4/2010 | Periyagaram et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1 | 10/2011 | Ishii |
| 2012/0102503 A1 | 4/2012 | Meijer et al. |
| 2012/0109985 A1* | 5/2012 | Chandrasekaran ......................... G06F 16/24544 707/754 |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1 | 10/2013 | McNeeney et al. |
| 2013/0290598 A1 | 10/2013 | Fiske et al. |
| 2014/0006465 A1 | 1/2014 | Davis et al. |
| 2014/0089264 A1 | 3/2014 | Talagala et al. |
| 2014/0223115 A1 | 8/2014 | Dinkjian et al. |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Hsiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1* | 7/2016 | Soncodi ............... G06F 3/0605 |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0123655 A1 | 5/2017 | Sinclair et al. |
| 2017/0147494 A1* | 5/2017 | Andre ................... G06F 12/023 |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1 | 7/2017 | Duncan |
| 2017/0255392 A1 | 9/2017 | Nakashima |
| 2017/0289214 A1 | 10/2017 | Cho et al. |
| 2017/0374147 A1* | 12/2017 | McNair ............... H04L 41/0896 |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 | 6/2018 | Gervais et al. |
| 2018/0184138 A1 | 6/2018 | Shaw et al. |
| 2018/0189175 A1 | 7/2018 | Ji et al. |
| 2018/0314727 A1 | 11/2018 | Epstein et al. |
| 2018/0329644 A1 | 11/2018 | Das et al. |
| 2018/0332325 A1* | 11/2018 | Kaitchuck ............. H04L 9/0643 |
| 2018/0332365 A1 | 11/2018 | Kaitchuck et al. |
| 2018/0332366 A1 | 11/2018 | Paduroiu |
| 2018/0332367 A1* | 11/2018 | Kaitchuck ............. H04L 65/612 |
| 2018/0336256 A1 | 11/2018 | Li et al. |
| 2018/0345140 A1 | 12/2018 | Posin |
| 2019/0004863 A1 | 1/2019 | Mainali et al. |
| 2019/0026301 A1 | 1/2019 | Wang et al. |
| 2019/0057138 A1 | 2/2019 | Knowles et al. |
| 2019/0129806 A1 | 5/2019 | Hsu et al. |
| 2019/0138494 A1 | 5/2019 | Inoue |
| 2019/0197173 A1 | 6/2019 | Tahara et al. |
| 2019/0278849 A1 | 9/2019 | Chandramouli et al. |
| 2019/0327297 A1 | 10/2019 | Madani |
| 2019/0332318 A1 | 10/2019 | Gooding et al. |
| 2019/0340180 A1 | 11/2019 | Barsness et al. |
| 2019/0349422 A1 | 11/2019 | Dhruvakumar et al. |
| 2020/0034468 A1 | 1/2020 | Lei et al. |
| 2020/0089420 A1 | 3/2020 | Sharoni et al. |
| 2020/0174695 A1 | 6/2020 | Bazarsky et al. |
| 2020/0250172 A1 | 8/2020 | Busjaeger et al. |
| 2020/0310686 A1 | 10/2020 | Truong et al. |
| 2020/0320005 A1 | 10/2020 | Shulman et al. |

(56) References Cited

U.S. PATENT DOCUMENTS

| | | | |
|---|---|---|---|
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0110328 | A1 | 4/2021 | Hsiao et al. |
| 2021/0124746 | A1 | 4/2021 | Klaedtke |
| 2021/0157520 | A1 | 5/2021 | Bavishi et al. |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2021/0374021 | A1 | 12/2021 | Santhakumar et al. |
| 2022/0035533 | A1 | 2/2022 | Danilov et al. |
| 2022/0182724 | A1 | 6/2022 | Gupta et al. |

FOREIGN PATENT DOCUMENTS

| | | |
|---|---|---|
| CN | 1708029 | 12/2005 |
| CN | 104901958 | 9/2015 |
| CN | 105591926 | 5/2016 |
| GB | 2377038 | 12/2002 |
| WO | 2002101585 | 12/2002 |
| WO | 2004/080067 A1 | 9/2004 |
| WO | 2009014993 | 1/2009 |
| WO | 2015/196281 A1 | 12/2015 |
| WO | 2015191120 | 12/2015 |
| WO | 2018148149 | 8/2018 |

OTHER PUBLICATIONS

Notice of Allowance received for U.S. Appl. No. 16/864,905, dated Nov. 30, 2022, 347 pages.

Tony Tung et al., "Topology Dictionary for 3D Video Understanding", IEEE Transactions on Pattern Analysis and Machine Intelligence ( vol. 34, Issue: 8, Aug. 2012), Dec. 2011, pp. 1645-1657.

A. Bulut et al., "Distributed data streams indexing using content-based routing paradigm", 19th IEEE International Parallel and Distributed Processing Symposium, Apr. 2005, pp. 1-10.

Notice of Allowance for U.S. Appl. No. 17/070,029, dated Dec. 2, 2022, 36 pages.

Non-Final Office Action received for U.S. Appl. No. 17/223,263, dated Nov. 28, 2022, 64 pages.

Non-Final Office Action received for U.S. Appl. No. 17/152,558, dated Dec. 7, 2022, 59 pages.

Non-Final Office Action received for U.S. Appl. No. 17/337,940, dated Dec. 30, 2022, 68 pages.

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [httsp://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Office Action dated Apr. 20, 2022 for U.S. Appl. No. 16/944,094, 48 pages.

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).

Notice of Allowance dated Apr. 27, 2022 for U.S. Appl. No. 17/127,724, 19 pages.

Office Action dated May 24, 2022 for U.S. Appl. No. 17/237,535, 62 pages.

Aloysius K. Mok, Honguk Woo and Chan-Gun Lee, "Probabilistic Timing Join over Uncertain Event Streams," 12th EEE International Conference on Embedded and Real-Time Computing Systems and Applications (RTCSA'06), 2006, pp. 17-26, doi: 10.1109/RTCSA. 2006.52. (Year: 2006).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year 2020).

Office Action dated Mar. 21, 2022 for U.S. Appl. No. 16/864,905, 125 pgs.

Edi Muskardin et al., "Implementation of Hashing Algorithms in Stream Mining", International Conference on Smart Systems and Technologies (SST), Oct. 2018 , pp. 233-238.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).

Office Action dated Apr. 12, 2022 for U.S. Appl. No. 17/038,102, 48 pages.

Office Action dated Jul. 8, 2022 for U.S. Appl. No. 16/864,892, 33 pages.

Office Action dated Jul. 15, 2022 for U.S. Appl. No. 16/864,905, 77 pages.

Office Action dated Sep. 1, 2022 for U.S. Appl. No. 16/944,094, 25 pages.

Office Action dated Jul. 21, 2022 for U.S. Appl. No. 17/070,029, 68 pages.

Notice of Allowance dated Aug. 24, 2022 for U.S. Appl. No. 17/152,544, 55 pages.

Office Action dated Sep. 15, 2022 for U.S. Appl. No. 17/383,425, 61 pages.

Phaujdar, "Understanding Event Streams—A Comprehensive Guide 101_ Learn Hevo" [https://hevodata.com/learn/understanding-event-streams/] (Feb. 17, 2021) (Year: 2021).

(56) References Cited

OTHER PUBLICATIONS

Dhanushka, "Understanding Kafka Topic Partitions" [https://medium.com/event-driven-utopia/understanding-kafka-topic-partitions-ae40f80552e8]—(Mar. 28, 2021) (Year: 2021).

Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).

Office Action dated Sep. 30, 2022 for U.S. Appl. No. 17/408,344, 66 pages.

Notice of Allowance dated Aug. 4, 2021 for U.S. Appl. No. 17/200,652, 51 pages.

Office Action dated Oct. 1, 2021 for U.S. Appl. No. 17/127,724, 41 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Making Sense of Stream Processing—The Philosophy Behind Apache Kafka and Scalable Stream Data Platforms; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

Office Action dated Oct. 1, 2021 for U.S. Appl. No. 16/915,762, 57 pages.

Office Action dated Jan. 21, 2022 for U.S. Appl. No. 16/864,892, 26 pages.

Notice of Allowance dated Feb. 24, 2022 for U.S. Appl. No. 17/038,079, 55pgs.

Azhar et al., "Efficient selection of access control systems through multi criteria analytical hierarchy process", IEEE, doi: 10.1109/ICET.2012.6375419, 2012, pp. 1-8. (Year: 2012).

Rox et al., "Construction and Deconstruction of Hierarchical Event Streams with Multiple Hierarchical Layers", IEEE, doi: 10.1109/ECRTS.2008.13, 2008, pp. 201-210. (Year: 2008).

Notice of Allowance dated Feb. 18, 2022 for U.S. Appl. No. 17/083,145, 70 pgs.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Nov. 15, 2022 for U.S. Appl. No. 16/864,892, 48 pages.

Notice of Allowance dated Nov. 23, 2022 for U.S. Appl. No. 17/408,344, 35 pages.

Notice of Allowance dated Nov. 17, 2022 for U.S. Appl. No. 16/944,094, 23 pages.

Notice of Allowance received for U.S. Appl. No. 17/063,906, dated Feb. 6, 2023, 29 pages.

Notice of Allowance received for U.S. Appl. No. 17/383,425, dated Feb. 1, 2023, 37 pages.

Non Final Office Action received for U.S. Appl. No. 17/976,574 dated Mar. 2, 2023, 55 pages.

Notice of Allowance received for U.S. Appl. No. 17/337,940 dated Mar. 1, 2023, 70 pages.

Notice of Allowance received for U.S. Appl. No. 17/223,263, dated Apr. 6, 2023, 32 pages.

Non-Final Office Action received for U.S. Appl. No. 17/503,024, dated Jun. 23, 2023, 87 pages.

Final Office Action received for U.S. Appl. No. 17/152,558, dated May 12, 2023, 51 pages.

Non Final Office Action received for U.S. Appl. No. 18/164,744 dated Aug. 31, 2023, 46 pages.

Notice of Allowance received for U.S. Appl. No. 17/976,574, dated Jul. 6, 2023, 41 pages.

\* cited by examiner

EVENT LEVEL RETENTION MANAGEMENT FOR DATA STREAMS

TECHNICAL FIELD

The subject application relates generally to data storage, and, for example, to a technology that manages retention policy in storage systems that implement data streams for storing and serving continuous and unbounded data, and related embodiments.

BACKGROUND

Contemporary data storage systems, such as DELL EMC's PRAVEGA system/data storage service, store data in a storage abstraction referred to as a stream. A stream is identified with a name, and can store continuous and potentially unbounded data; more particularly, a stream comprises a durable, elastic, append-only, sequence of stored events. One stream may be divided into one or more segments, with a stream append based on a routing key associated with an event that determines to which segment the event data is written. Older stream data can be aggregated into chunks and written to an object storage system (e.g. Dell EMC's ECS data storage system) or to a file storage system (e.g. DELL EMC's ISILON data storage system).

New events are added to a tail (front) of a stream. As can be readily appreciated, PRAVEGA is thus ideal for IoT (Internet of Things) data, where devices/sensors may generate thousands of data points per second. Notwithstanding, PRAVEGA may be highly beneficial for storing data corresponding to more traditional workloads, such as financial trading data that regularly changes.

Although a stream is potentially unbounded, storage resources are finite. PRAVEGA provides ways to cut a stream short, including an automatic data expiration feature. When cut, the events are deleted from a head (back) of a stream. Not all stream data can simply be truncated, however, as data retention policies need to be followed for some types of data, typically for regulatory compliance or business reasons. When data retention policy (a retention period) is specified at the stream level, the administrator responsible for complying with the policy is forced to choose the longest retention period that an event in the stream has, and use that retention period as the stream retention period. This normally results in being too conservative with data retention for other events, as events with a short retention period are retained for too long.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
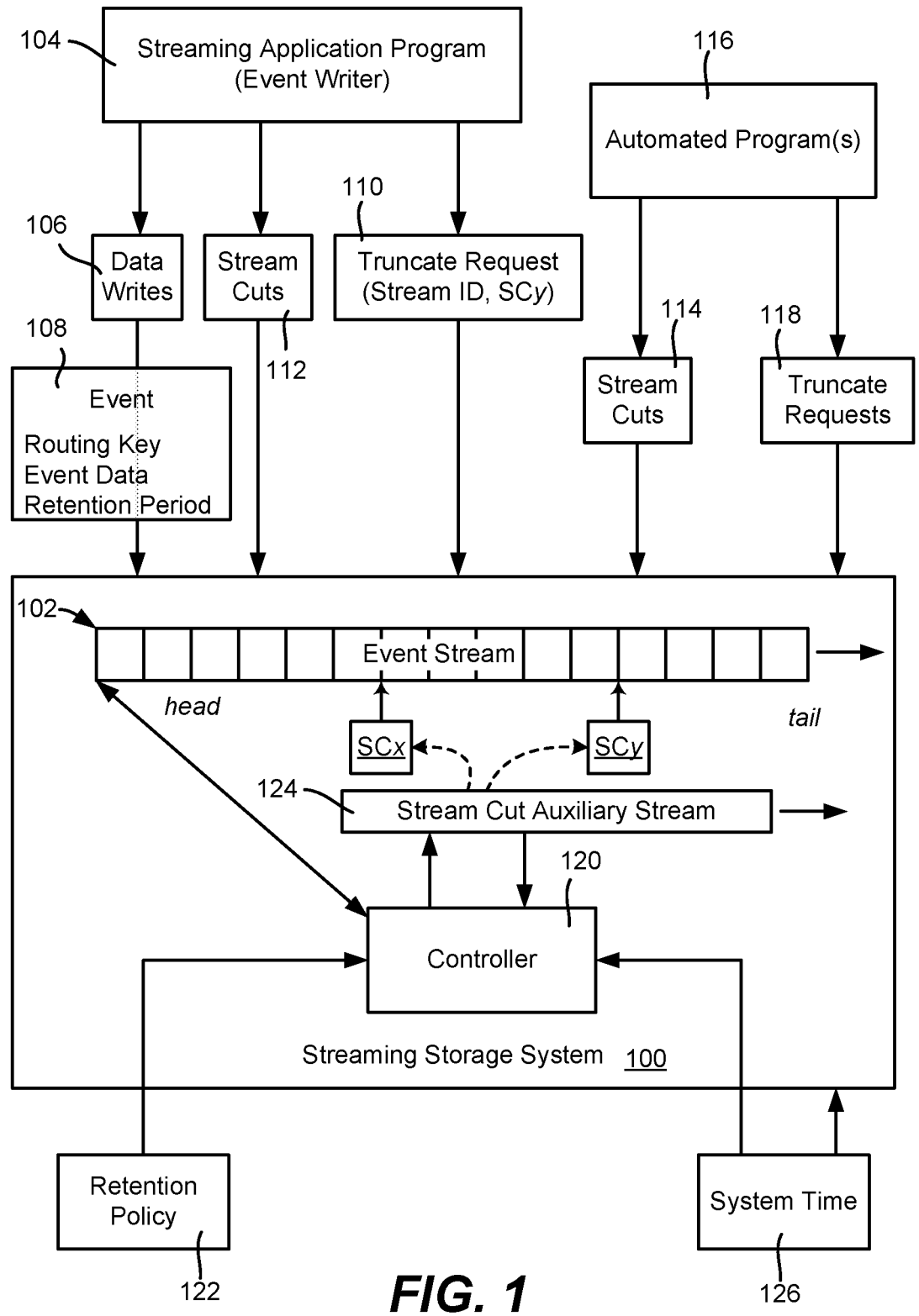
FIG. 1 is a block diagram representation of example components and data—related operations in a streaming data storage system subject to event-level data retention policy, in accordance with various aspects and implementations of the subject disclosure.

Various aspects of the technology described herein are generally directed towards implementing fine-grained data retention management in stream-based data storage systems, which facilitates specifying retention policy at the event level. In one aspect, there is a fixed retention period associated with each event. The retention period starts at the moment the event is created and ends when the specified time has elapsed. The technology described herein operates to ensure that the event cannot be deleted while the event is under retention.

In general, and as will be understood, the data storage system does not retain a retention time with each event appended to a data stream, which (while feasible in some scenarios) is generally impractical in most scenarios because of the amount of additional data that would be added to each stream. Instead, a retention end time (obtained from the current time and the event's retention period) is determined for each event, and the longest retention end time maintained per-segment for the events in that segment. A stream cut retention end time is determined from the longest retention end time of the retention end times of the segments. Events are truncated based on the stream cut time, and are grouped together into stream fragments defined by successive stream cut objects, (or simply stream cuts), that can be associated with a data stream.

It should be understood that any of the examples herein are non-limiting. For instance, some of the examples are based on PRAVEGA data storage technology; however virtually any stream-based data storage system may benefit from the technology described herein. As a more particular example, instead of tracking time for each event written in PRAVEGA, a "stream cut object" or simply a "stream cut" refers to a specific position in the data stream that is generated by a data writer; older data needs to be deleted from a stream cut boundary (rather than arbitrarily), unless any of data to be deleted within the retention policy period as described herein. A stream cut is associated with a time value, referred to as a stream cut retention end time. Other data stream storage systems can use a similar concept, or can use timestamped data; notwithstanding, as will be understood, the technology described herein can be applied to any stream-based data storage mechanism. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes an event stream 102 comprising a data stream of events, with event writes being appended from a head towards a tail direction. Note that for simplicity, FIG. 1 does not illustrate the concept of stream segments, (which are shown herein with reference to FIG. 2).

In general, an event writer such as a streaming application program 104 sends data writes (events) 106 to the streaming data storage system 100 for appending to the event stream 102. As described herein, a data write event 108 comprises a routing key, the event data (payload) and a retention period for that event 108. As described herein, the application program 104 can also send truncate requests 110 to the streaming storage system 100, such as by identifying the stream for which truncation is requested, and specifying a particular stream cut.

More particularly, as set forth herein, a position in a stream at an event boundary is specified using a stream cut. The application program 104 can request association of a stream cut with a stream, as represented by block 112.

Instead of, or in addition to, application-specified stream cuts, stream cuts 114 can be created automatically, such as periodically, by automated program(s) 116 or the like. The automated program(s) can also send truncate requests 118, such as when the stream reaches a size capacity limit. As described herein, a controller 120 can also generate stream cuts, such as periodically based on retention policy 122, which can include granularity (how often to generate a next stream cut).

The stream cuts for a stream can be considered a series of stream cuts. In one or more implementations, the stream cuts may be maintained as an auxiliary system stream 124 associated with the main data stream, e.g., the event stream 102 in FIG. 1. A time-based value (e.g., obtained from the system time 126) can be associated with each stream cut, such as corresponding to when a given stream cut object will reach a stream cut retention end time, which as described herein depends on the events' retention end times. Note that the correct system time (block 126) can be obtained via use of the NTP (Network Time Protocol).

Turning to aspects related to data retention, FIG. 1 exemplifies the controller 120 that can include retention enforcement logic that enforces the retention policy 122, corresponding to a retention time period, associated with the event stream 102. A retention policy 122 can be associated with an individual stream, multiple streams within a specified scope, or possibly the entire set of streams of a streaming storage system.

In general, before truncating any data, the controller 120 evaluates whether the truncation request is allowable based on the retention policy 122. The controller 120 operates to block any request, either a manual or automatic attempt, to truncate a stream part that is prior to the time specified in the stream cut for which truncation is requested. Only older events before a specified stream cut can be removed from the stream.

As described herein, each stream cut has an associated retention end time, namely the maximum retention time of any event prior to the stream cut in one implementation. When a stream is requested to be truncated, the controller 120 evaluates whether the retention end time of the specified stream cut is in in the future. If not, the truncation is allowed to occur; otherwise the controller 120 blocks the request.

Figure 2:
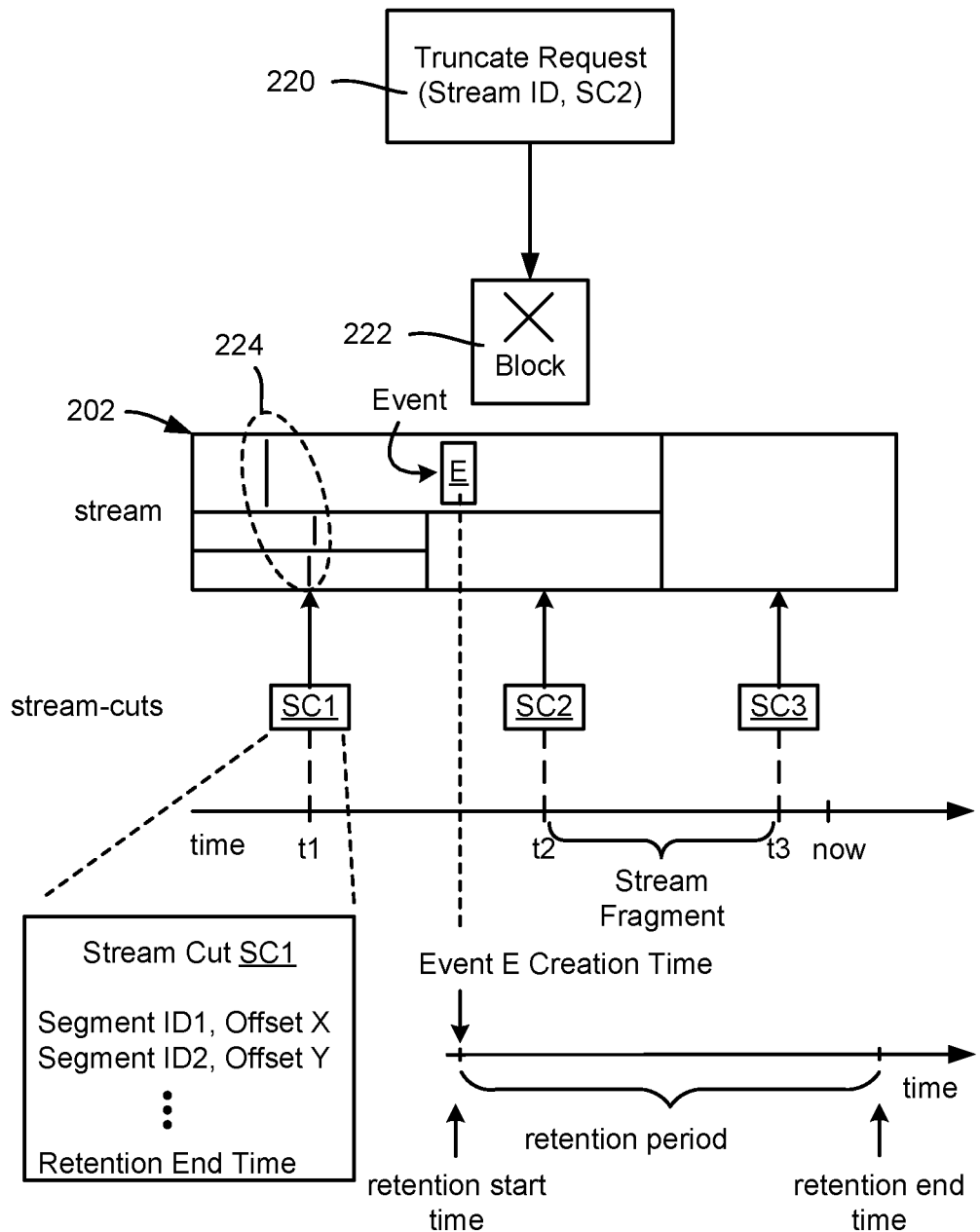
FIG. 2 is an example representation of how an event with a retention period is appended to a segment of a data stream, in which stream cuts divide the data stream into stream fragments, in accordance with various aspects and implementations of the subject disclosure.

FIG. 2 shows an example of a truncation request 220 being blocked. Note that FIG. 2 shows a segmented stream of events, including an event E, in that the segments are represented as separate rectangles that make up the stream 202. The segment to which an event is appended is based on a hash computation of the event's routing key. As described herein, the number of segments is elastic, and can change over time (scale up or down) based on the current ingestion rate of events.

FIG. 2 also illustrates the concept of periodically created stream cuts. The three stream cuts shown are created at times t1, t2, and t3, each pair of which creates a stream fragment; there is thus a stream fragment between SC1 and SC2, and another stream fragment between SC2 and SC3. A retention period is specified for the event E; as is shown, the retention period for the event E starts somewhere between times t1 and t2, and ends somewhere after time t3. The stream cannot be truncated using the stream cut SC2 corresponding to time t2 or the stream cut SC3 corresponding to time t3, because doing so would impact (delete) data, including the event E, that is still under retention. Eventually the current time will surpass the retention end time of stream cut SC3, and the event E can be truncated/deleted.

Thus, in FIG. 2 when a truncation request 220 is received, the specified stream cut (SC2 in this example) is evaluated to determine whether the specified stream cut (SC2) is within the retention period. Accordingly, as described herein and as shown in FIG. 2, the truncate request 220 is blocked (block 222).

FIG. 2 further shows information related to data retention being associated with stream cuts via stream cut SC1 expanded to show its contents. As can be seen, there is a retention end time associated with the stream cut SC1, as well as each other stream cut (not explicitly shown). When there is a stream truncation request, the retention end time of the specified stream cut is compared to the current system time. If the retention end time is in the future, stream truncation is blocked, otherwise stream truncation is allowed.

To determine a retention end time for a stream cut, a retention period is associated with individual events, although as set forth above, there is no need to store per-event retention periods. Instead, the retention period of an event is used at event creation time, and discarded thereafter as described herein.

A retention end time for an event i can be calculated for an individual event at the moment of the event creation using the equation below:

$$\text{event}[i]\cdot\text{retention\_end\_time}=\text{event}[i]\cdot\text{creation\_time}+\text{event}[i]\cdot\text{retention\_period}$$

As a stream cut protects the events that are ahead of a stream cut from premature deletion, the stream cut inherits a retention end times based on the longest of the retention end times determined from a group of events, that is:

$$\text{stream\_cut}[j]\cdot\text{retention\_end\_time}=\max(\text{event}[i]\cdot\text{retention\_end\_time})$$

where event[i]'s are the events that were created before the stream cut. The events normally belong to different segments and the set of active segments may change as the stream scales up and down. Therefore, the inheritance of retention end times includes considering scaling, as described below.

A retention end time calculation for a stream is a constant process that can be considered something analogous to snapshots for individual stream cuts. As the calculations in one implementation use the max( ) function, a retention end time for a stream looks like a "retention front" that can move forward but cannot move backward.

As shown in FIG. 2, stream cuts divide a stream into a sequence of stream fragments, where a stream fragment is the part of a stream between two successive stream cuts. There is a generally a plurality of events stored within each stream fragment and these events may reside in different stream segments. Each new stream cut "closes" another stream fragment; as highlighted in FIG. 2 by the dashed oval 224 containing lines representing event boundaries in segments corresponding to stream cut SC1. As shown via the event boundaries represented within the example dashed oval 224, because each stream cut divides a stream into two parts, each such stream cut needs to cross those segments that were active at the time the stream cut was generated. As such, a stream cut is a collection of key-value pairs (Key=Segment, Value=offset within segment), with one such pair for each segment that the stream cut crosses. As described herein and shown in FIG. 2, a stream cut such as exemplified by the expanded stream cut SC1, the metadata for each stream cut may include a set of groupings, e.g., segment name or identifier (ID) and offset within the segment pairs of (where the offsets are at an event boundaries in each active segment), along with the aforementioned stream cut retention end time (RET).

Thus, a stream cut contains the offset locations (lengths) of the various segments; a stream cut does not divide an event, but rather defines an event boundary for each segment. Events may have very different retention periods and events of different types may have with very different intervals between them. Thus, it is possible that a stream cut has a retention end time that was calculated not for some event from a recent stream fragment, but for an event from a quite distant stream fragment. Further, as two or more successive stream cuts may share a retention end time, retention periods associated with stream cuts may be very different. For example, a zero retention period is possible for a stream cut.

The technology of more fine-grained retention management can work with the existing time-based data expiration feature, which does not delete data under retention. Therefore, there are different natural use-cases for the data expiration feature, including one in which the expiration period is set to a value that is greater or equal to the maximal retention period an event in the stream may have, or the expiration period is set to zero; (in this latter case, the expiration feature deletes data shortly after its retention has ended).

Figure 3:
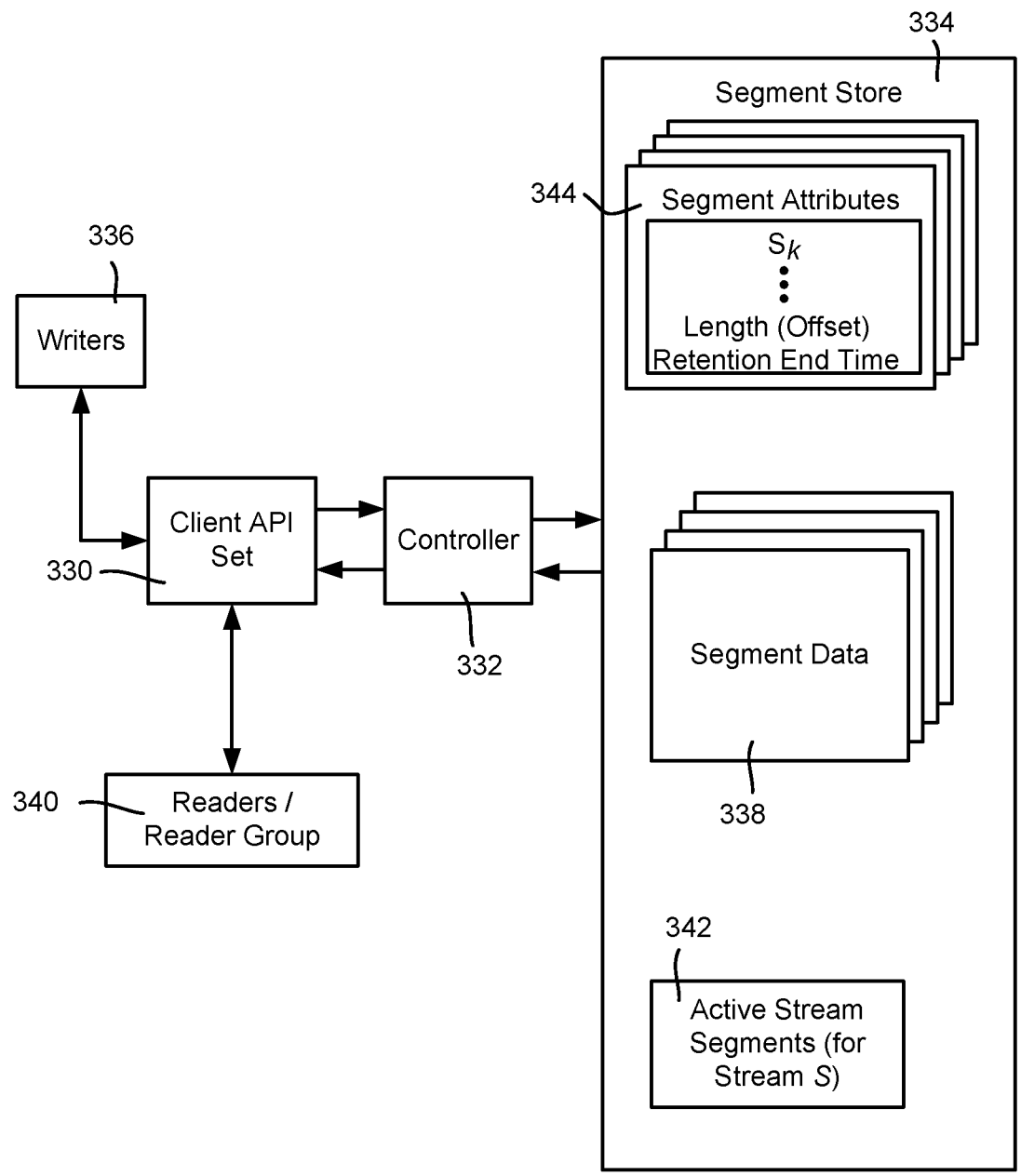
FIG. 3 is a representation of example components and data structures that facilitate event-level data retention, in accordance with various aspects and implementations of the subject disclosure.

Turning to an example implementation as represented in FIG. 3, in general the streaming data storage system/platform (e.g., PRAVEGA) has a client component 330 that provides an API to the system, a controller 332 (e.g., corresponding to the controller 120 of FIG. 1) that acts a system coordinator, and a segment store 334 that manages the segments of a stream. Application writers 336 provide the events to be appended to a data stream (e.g., to segment data 338, with the segment determined based on the event routing key) via the client component 330. A segment can be active in that the segment accepts event appends, or sealed following a scale-up or scale-down event as described herein.

Application readers 340, which can be individual readers or groups of readers, read and process the segment data 338. In general, a reader can read from multiple different segments, but no two readers read from the same segment.

The segment store 334 can be stream-agnostic, as the segment store 334 manages individual segments; it is one of the controller's tasks to unite segments into streams. The controller 332 also generates and maintains stream cuts (in the stream cut auxiliary segment stream) as described herein.

More particularly, the process for generating a stream cut SC for a stream S can be based on triggers. For example, when an expiration policy is configured on the stream S, and the stream S is configured to be compliant (that is, the stream S may store events under retention, the controller 332 periodically triggers a stream cut generation on stream S based on its expiration policy and/or granularity. With respect to granularity, when configuring an expiration policy for a compliant stream, the application/administrator may specify granularity (how often to generate the stream cuts).

Figure 4:
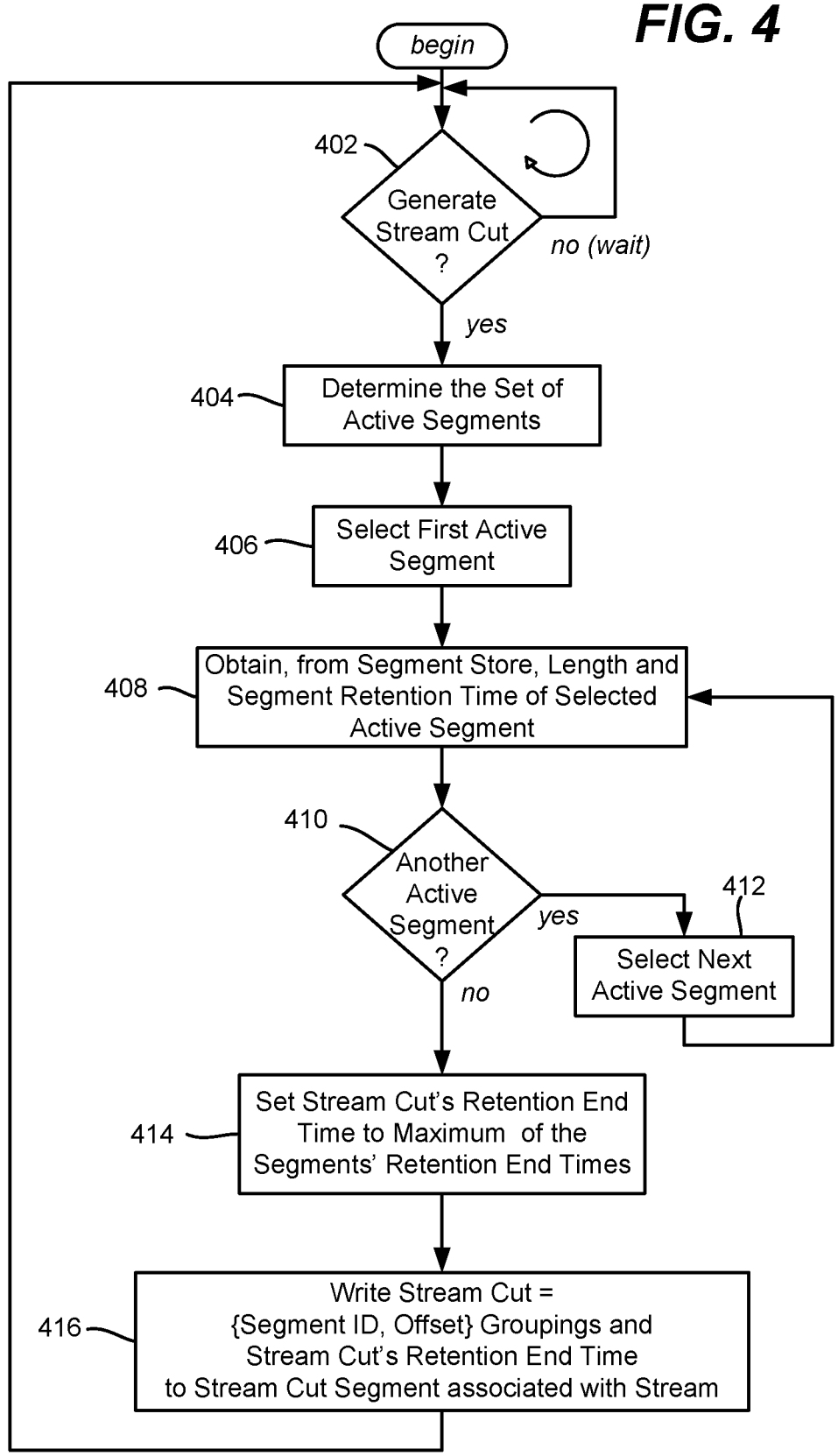
FIG. 4 is a flow diagram showing example operations related to generating a stream cut with a retention end time, in accordance with various aspects and implementations of the subject disclosure.

FIG. 4 shows example operations for generating a stream cut, beginning at operation 402 where the controller begins stream cut generation-related operations, e.g., periodically. As represented by operation 404 and by the components and data structures of FIG. 3, the controller 332 inspects the metadata for stream S to determine the set of active segments 342; (note that a segment that is scaled up or scaled down can be an inactive segment). The metadata for stream S that includes the active stream segments 342 is shown as being maintained in the segment store 334, however it is understood that any suitable data structure accessible to the controller 332 can maintain a stream's metadata.

For each segment $S_k$ in the active segment set of S, (operations 406, 410 and 412), the controller 332 issues a request at operation 408 to the segment store 334 to obtain/retrieve the segment $S_k$'s length and the segment $S_k$'s retention end time, which are maintained as segment attributes 344 in the segment store 334 (as described herein and shown in FIG. 3).

More particularly, the various segments' metadata (attributes 344) may be stored in the segment store 334, although it is feasible to store some of it in other suitable location(s) in any number of ways. Note that in one or more implementations, a segment store such as 334 already maintain some segment metadata/attributes (e.g., relating to $S_k$'s length, truncation status, sealed status, how much of $S_k$ is in Tier 1 versus Tier 2 storage and so on, and thus for example, the segment store 334 may add to this this metadata to store the segment's retention time $S_k$.RET as well, as shown in the segment attributes 344 in FIG. 3.

In one implementation, at operation 414 the controller 332 calculates the stream cut SC's retention end time (RET) as RET:=max($S_k$.RetentionEndTime) (where $S_k$ is an active segment as described herein). Thus, the longest retention time of any active segment is used for the stream cut's retention end time RET. At operation 416, the controller 332 writes the stream cut SC's (segment ID, offset) mappings and the stream cut retention end time as a stream cut to the stream cut segment associated with Stream S, (e.g., the stream cut auxiliary stream 124 for the stream 102 in FIG. 1).

Figure 5:
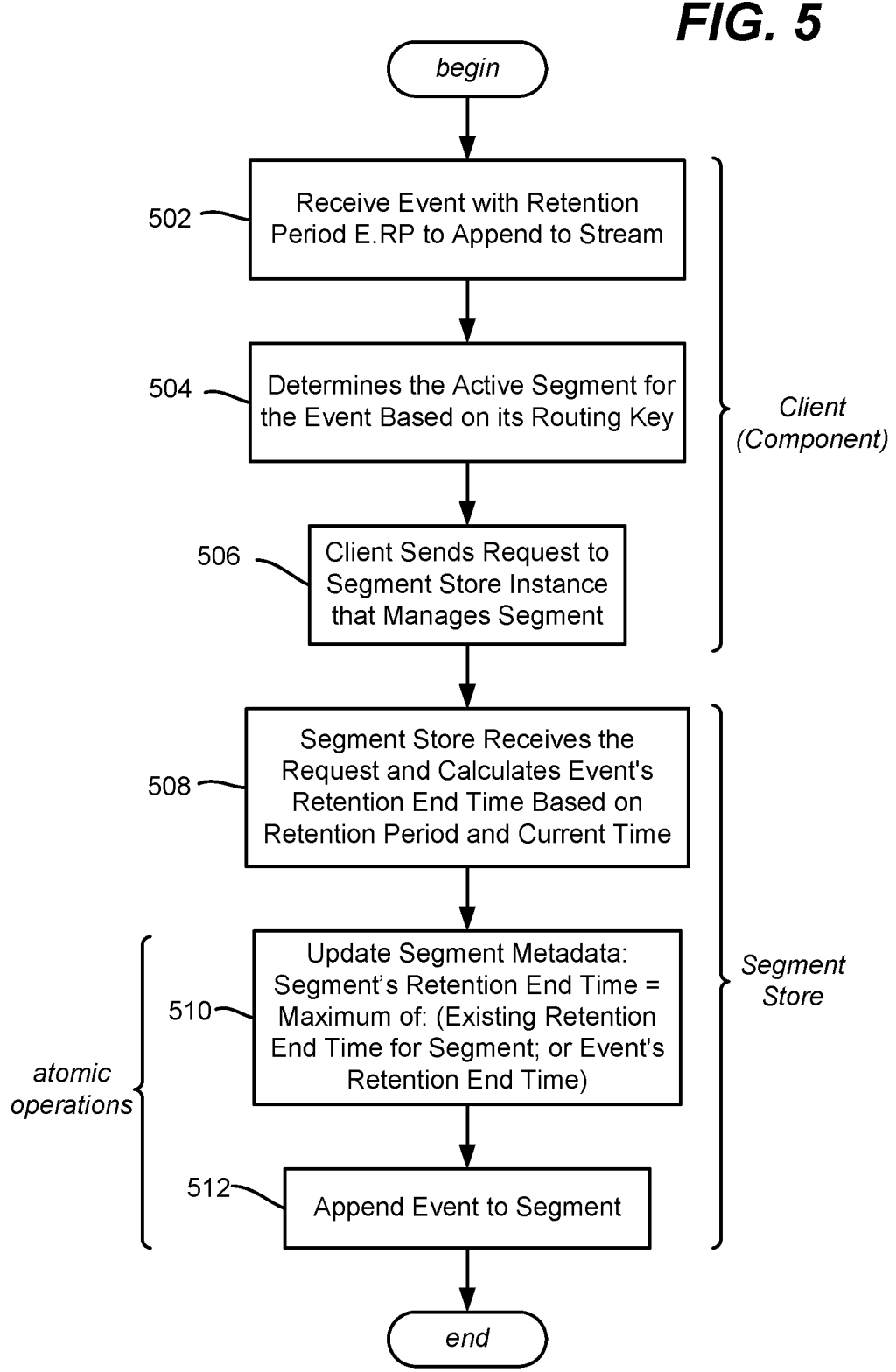
FIG. 5 is a flow diagram showing example operations related to handling an event that has a retention period, in accordance with various aspects and implementations of the subject disclosure.

The segment store 334 is responsible for keeping track of the (longest) retention end time of the events in a segment. As set forth herein, the system does not need to store the retention period or retention end time for each event (which would waste resources). Instead, FIG. 5 shows an implementation of example operations as to how the segment store 334 may maintain the retention end time for stream segments (so that the controller 332 can use that information to maintain in a stream cut).

At operation 502, the client component 330 receives an event E with a retention period E.RP to be appended to the stream S. At operation 504, the client 330 determines that the event E (based on its routing key has computation) is to be written to an active segment $S_k$. The client identifies the appropriate segment store instance (e.g., 334) that manages $S_k$, and sends the request to that segment store instance 334 at operation 506.

At operation 508, the segment store 334 receives the request to append E to $S_k$, with the current time being T. In one implementation, the event E's retention end time is therefore calculated as E.RET:=T+E.RP; (although it is feasible for the event E's retention end time to be determined sooner). For the segment, the segment store determines the segment $S_k$'s retention end time metadata to be $S_k$.RET:=Max($S_k$.RET, E.RET), that is, the segment $S_k$'s retention end time is the longer of either the existing retention end time for that segment, or the new event's retention end time, as updated (if appropriate) via operation 510.

Operation 512 appends the event E to the segment $S_k$. It should be noted that, in conjunction with appending the event E to the segment $S_k$, the segment store atomically updates $S_k$'s metadata to ensure that $S_k$'s retention end time is set as described in operation 510 as described above. The atomicity of operations 510 and 512 prevent a situation in which the segment's retention end time is updated before or after the event is persisted, then a controller request (as described above) may get incorrect/inconsistent information about $S_k$'s length and retention end time, which could possibly lead to the premature deletion of events during an expiration operation.

Once these (atomic) operations 510 and 512 are done, when the controller 332 requests information as described herein (at operation 408 of FIG. 4), the segment store reads $S_k$'s length and retention end time RET from its metadata and returns in response to the controller's request.

Turning to another aspect, because a stream is elastic in that segment(s) may be sealed and new segment(s) may replace them as successor(s) in a scale up or scale down event. This means the retention end time for a stream cut needs to consider stream scale events, because stream cuts are not necessarily calculated upon stream scale events, and there may be multiple such scale events occurring between successive stream cut generations.

Figure 6:
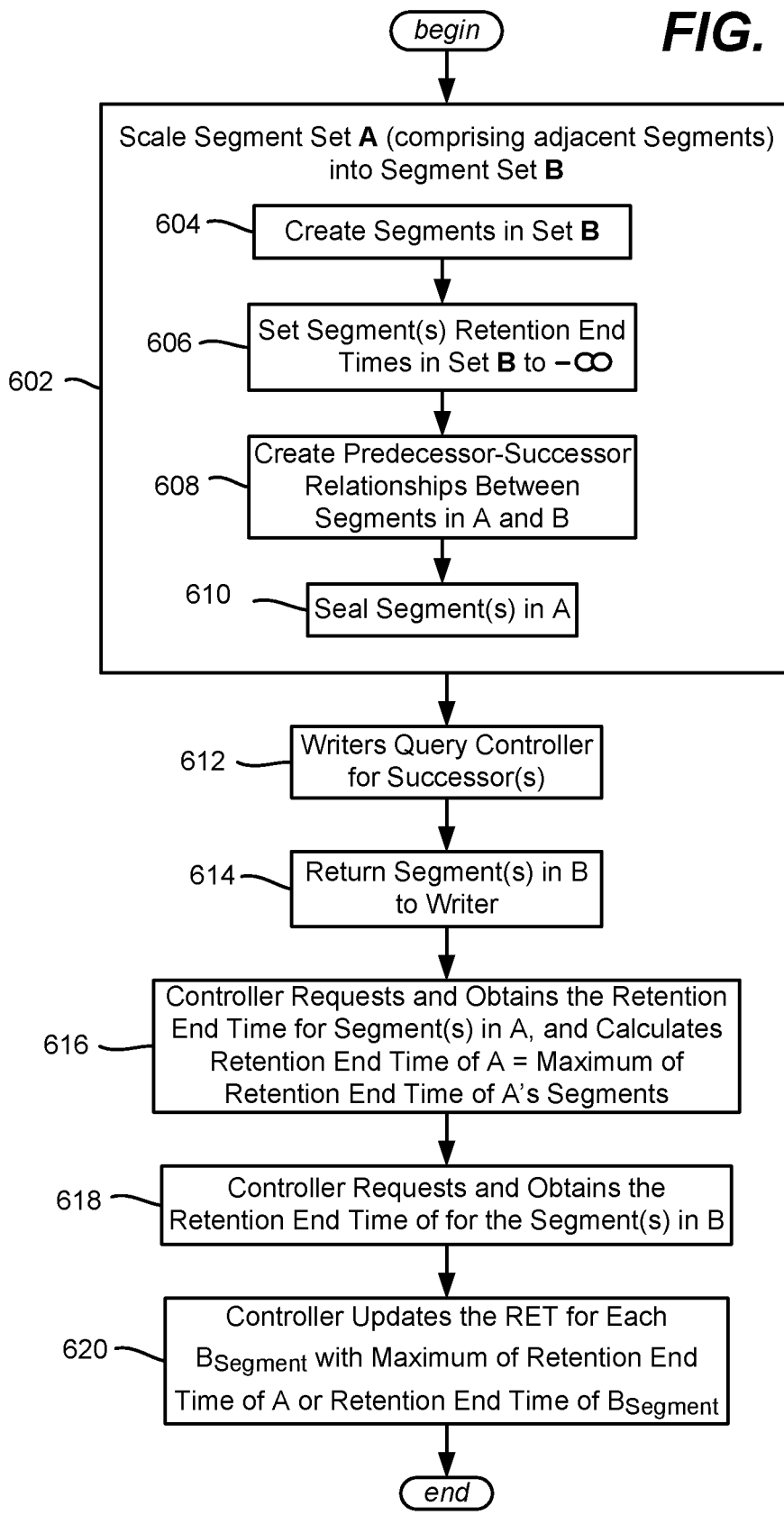
FIG. 6 is a flow diagram showing example operations related to scaling segments in a data stream, in accordance with various aspects and implementations of the subject disclosure

FIG. 6 shows a number of operations where (in general) operation 602 represents when the controller performs a scale event on Stream S. In this example, the controller scale segment set A (made of one or more adjacent segments) into a different number of segments in segment set B (made of adjacent Segments, spanning the same routing key space as those in segment set A). For a split scale up event, segment set A has one segment and segment set B has two segments; for a merge scale down event, segment set A has two segments and segment set B has one segment. Note however that this only describes typical split and merge scaling events, respectively, as there is nothing preventing an n-to-m scaling event (e.g., two segments to three, five segments to two, or the like), but such occurrences have much less practical applicability.

At operation 604, the controller creates the segments in the segment set B, and at operation 606 also sets their respective retention end times (RETs) to −∞. At operation 608 the controller creates the predecessor-successor relationships between the segments in A and B, and at operation 610 the controller seals the segments in the segment set A.

Once sealed, writer applications attempting to write to the segment or segments in the segment set A are notified that they are sealed, in which situation a writer applications queries (operation 612) the controller for successors, and thereby (via operation 614) obtains a segment in the segment set B.

At operation 616, the controller requests the retention end time (RET) for each segment's $A_{segment}$ in the segment set A and calculates A.RET=max($A_{segment}$.RET). At operation 618, the controller requests the retention end time (RET) for each segment $B_{segment}$ in the segment set B.

At operation 620, the controller sends a request to the segment store(s) owning the segment(s) in B to update those segments' retention end time RETs. For each Segment $B_{segment}$ in B, $B_{segment}$.RET:=max($B_{segment}$.RET, A.RET). The maximum of B's segment retention end time or segment set A's maximum retention end time ($A_{segment}$.RET) is used, because it is possible that while executing this operation, the writer(s) may have already written events to segments in the segment set B, and such writes, as described herein, would have already updated the retention end time for those segments, and thus this information is not lost.

Figure 7:
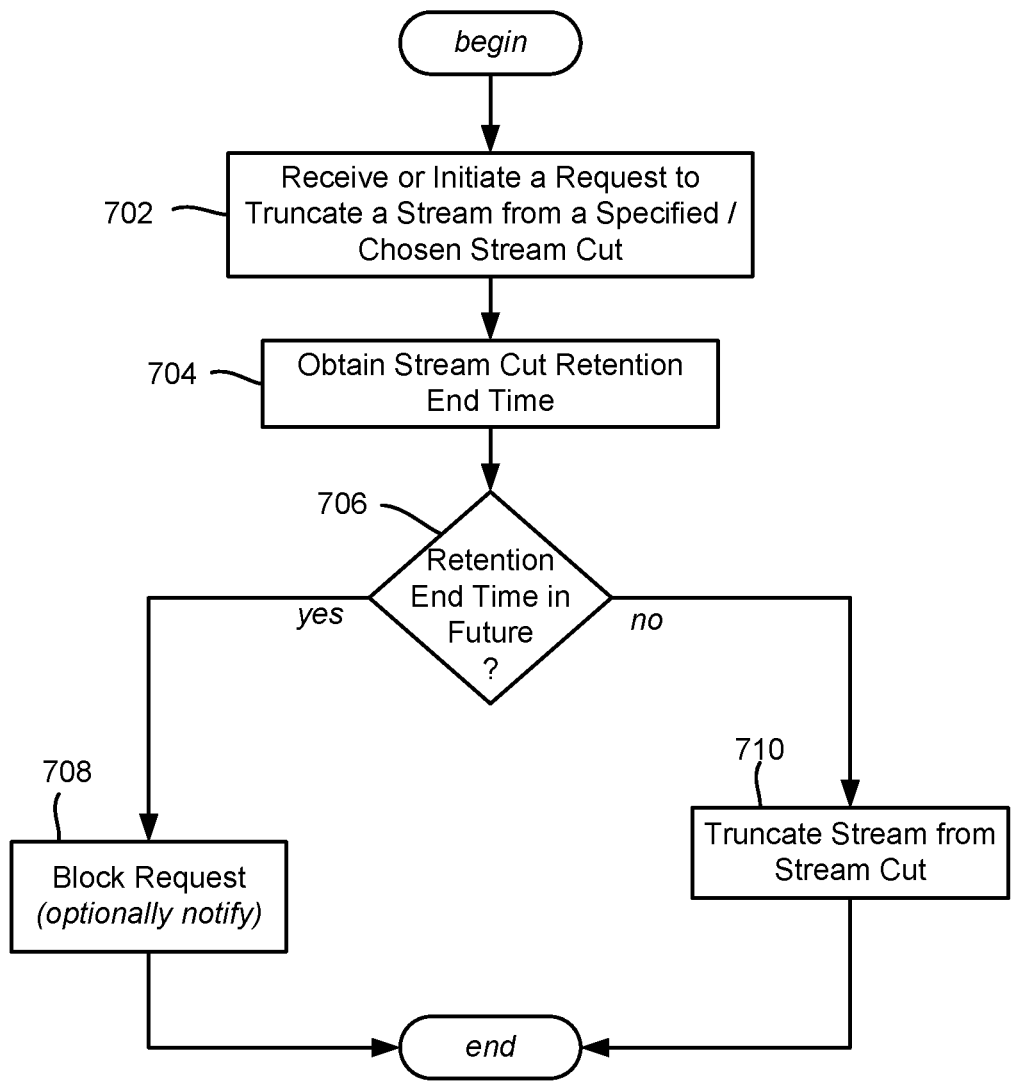
FIG. 7 is a flow diagram showing example operations related to handling a data stream truncation request with respect to a stream cut, in accordance with various aspects and implementations of the subject disclosure.

FIG. 7 shows the data expiration process that prevents the controller from truncating stream fragments that need to be kept. As set forth herein, an application can attempt to truncate a controller, and/or the controller can (e.g., periodically) check and attempt to truncate a segment, based on eligibility. Example triggers and/or expiration policy dictating stream truncation are known, and thus are not described herein for purposes of brevity.

When the controller determines (operation 702) that it is time to perform a truncation at a stream cut SC (e.g., based on the expiration policy or another request), at operation 704 the controller obtains the stream cut's retention end time the SC's (SC.RET) from the stream cut object. At operation 706 the controller compares the stream cut's retention end time SC.RET with the current time T to determine whether the stream cut's retention end time is in the future. If so, that is, if SC.RET>T, the controller aborts the operation, as represented by operation 708. Otherwise, if at operation 706 SC.RET<=T, the truncation based on the location of stream cut SC may proceed, as represented by operation 710.

Figure 8:
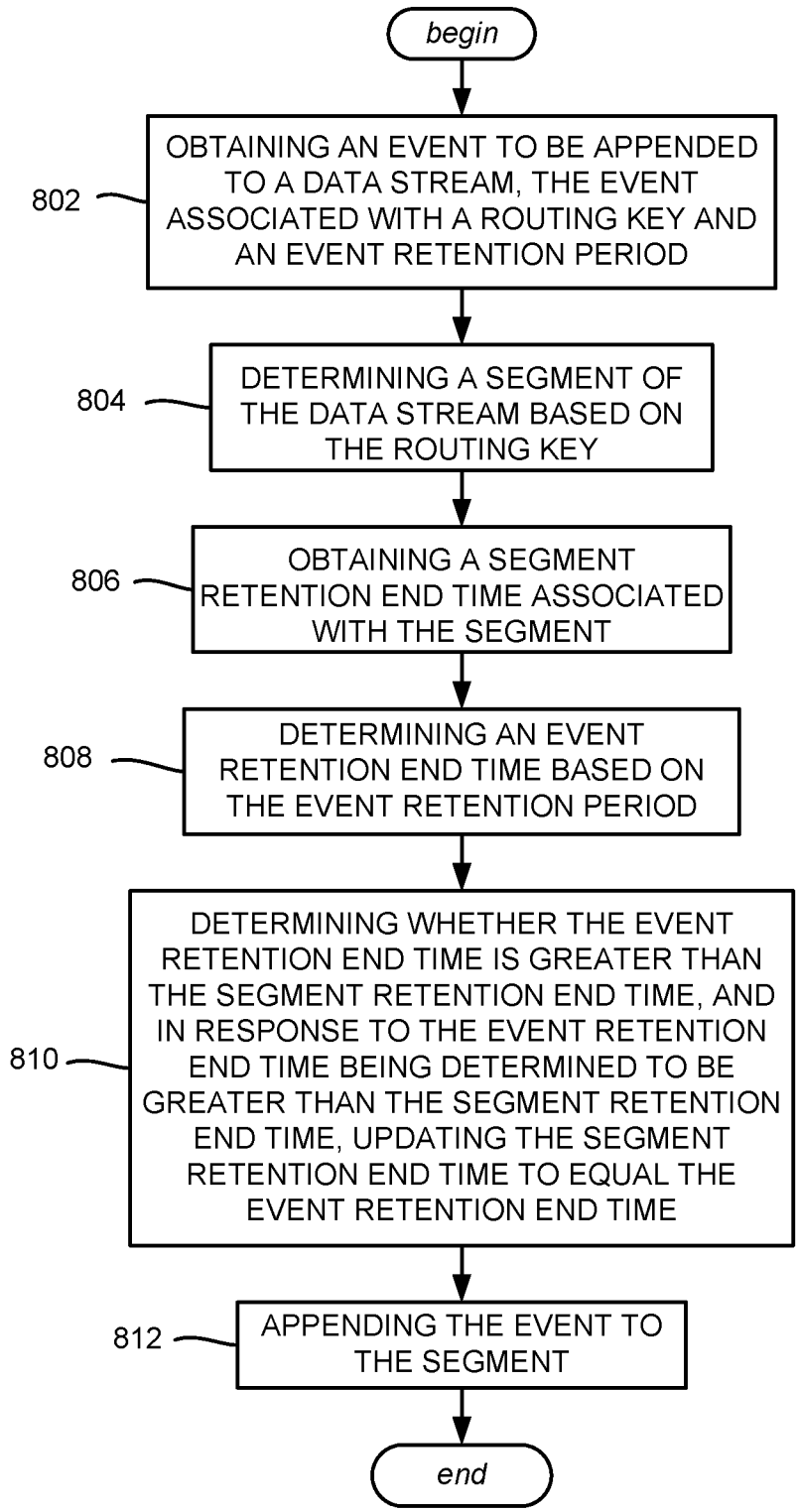
FIG. 8 is an example flow diagram showing example operations related to appending an event with a retention period to a segment of a data stream, in accordance with various aspects and implementations of the subject disclosure.

One or more aspects can be embodied in a system, such as represented in FIG. 8, and for example can comprise a memory that stores computer executable components and/or operations, and a processor that executes computer executable components and/or operations stored in the memory. Example operations can comprise operation 802, which represents obtaining an event to be appended to a data stream, the event associated with a routing key and an event retention period. Operation 804 represents determining a segment of the data stream based on the routing key. Operation 806 represents obtaining a segment retention end time associated with the segment. Operation 808 represents determining an event retention end time based on the event retention period. Operation 810 represents determining whether the event retention end time is greater than the segment retention end time, and in response to the event retention end time being determined to be greater than the segment retention end time, updating the segment retention end time to equal the event retention end time. Operation 812 represents appending the event to the segment.

Appending the event to the segment and the updating the segment retention end time to equal the event retention end time can occur in an atomic operation.

The segment retention end time can be maintained in metadata of a segment store instance associated with the segment.

Further operations can comprise determining a group of active segments associated with the data stream, determining a stream cut retention end time based on which active segment is determined to have a largest segment retention end time, and writing a stream cut to an auxiliary stream cut segment associated with the data stream, the stream cut comprising the stream cut retention end time. The stream cut further can comprise respective segment identifier, segment offset groupings for respective active segments of the group.

Further operations can comprise receiving a request to truncate the data stream, the request associated with the stream cut, obtaining the stream cut retention end time associated with the stream cut, determining whether the stream cut retention end time is ahead of the current time, and, in response to the stream cut retention end time being determined not to be ahead of the current time, truncating the data stream based on the stream cut. Further operations can comprise, in response to the stream cut retention end time being determined to be ahead of the current time, blocking the request.

Further operations can comprise detecting a scaling event that creates successor segments from a predecessor segment, and, for each successor segment, setting the segment retention time to the longer of the retention time of the predecessor segment or a maximum retention time of any event appended to the successor segment.

Further operations can comprise detecting a scaling event that merges predecessor segments into a successor segment, and, in response to the scaling event, obtaining a maximum retention time of the predecessor segments, and setting the segment retention time of the successor segment to the longer of the maximum retention time or a maximum retention time of any event appended to the successor segment.

Figure 9:
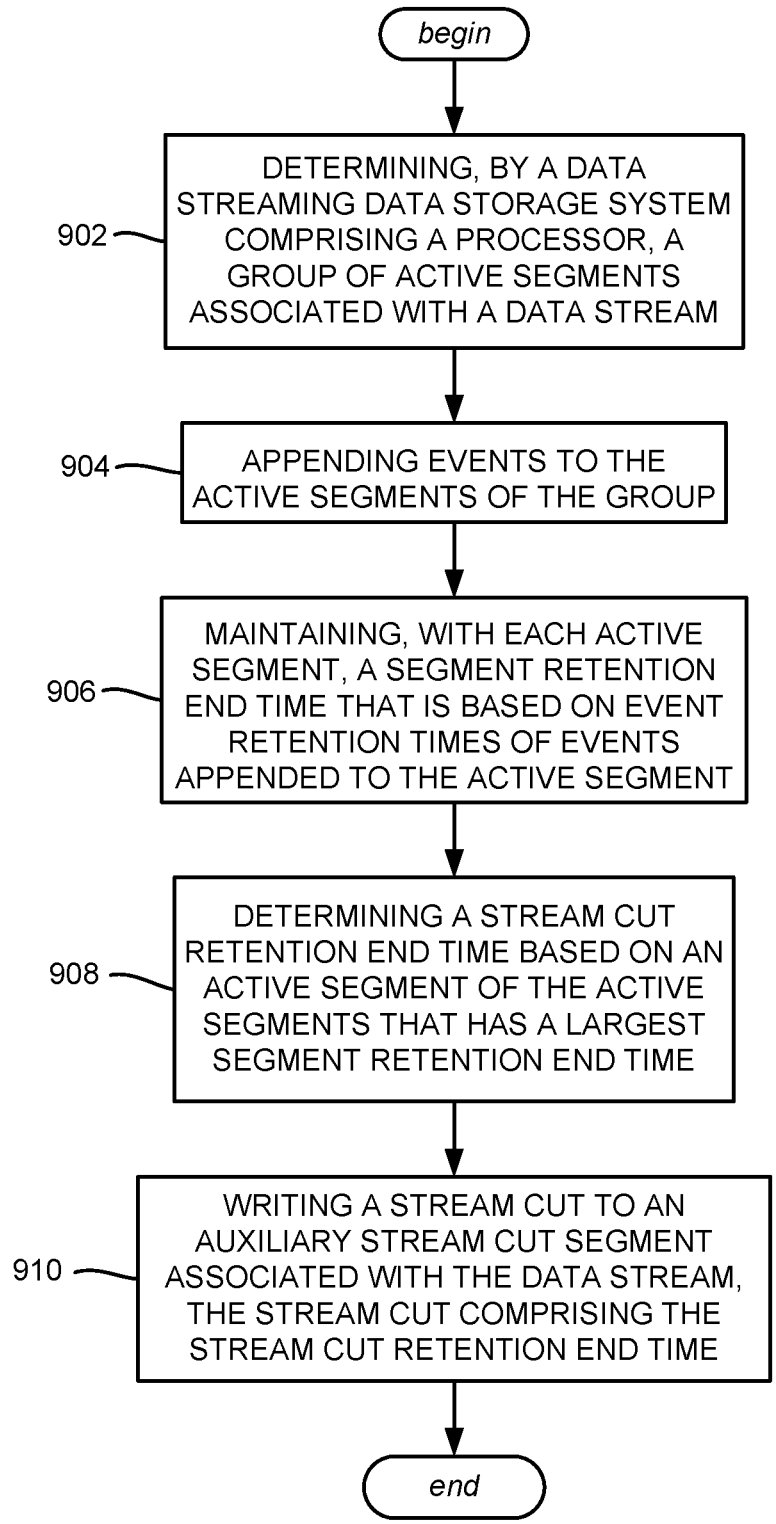
FIG. 9 is an example flow diagram showing example operations related to maintaining segment-related data and using the segment-related data with respect to a stream cut, in accordance with various aspects and implementations of the subject disclosure.

One or more example aspects, such as corresponding to example operations of a method, are represented in FIG. 9. Operation 902 represents determining, by a data streaming data storage system comprising a processor, a group of active segments associated with a data stream. Operation 904 represents appending events to the active segments of the group. Operation 906 represents maintaining, with each active segment, a segment retention end time that is based on event retention times of events appended to the active segment. Operation 908 represents determining a stream cut retention end time based on an active segment of the active segments that has a largest segment retention end time. Operation 910 represents writing a stream cut to an auxiliary stream cut segment associated with the data stream, the stream cut comprising the stream cut retention end time.

Maintaining, with each active segment, the segment retention end time can comprise keeping a maximum event retention time among the events appended to the active segment as the segment retention end time.

Aspects can comprise receiving a request to truncate the data stream, the request associated with the stream cut, obtaining the stream cut retention end time associated with the stream cut, determining whether the stream cut retention end time is ahead of the current time, and, in response to the stream cut retention end time being determined to be ahead of the current time, blocking the request.

Aspects can comprise, in response to the stream cut retention end time being determined not to be ahead of the current time, truncating the data stream based on the stream cut.

Aspects can comprise detecting a scaling event that creates successor segments from a predecessor segment, and for each successor segment, setting the segment retention time to the greater of the retention time of the predecessor segment or a maximum retention time of any event appended to the successor segment.

Aspects can comprise detecting a scaling event that merges predecessor segments into a successor segment, and, in response to the scaling event, obtaining a maximum retention time of the predecessor segments, and setting the segment retention time of the successor segment to the greater of the maximum retention time of the predecessor segments or a maximum retention time of any event appended to the successor segment.

Figure 10:
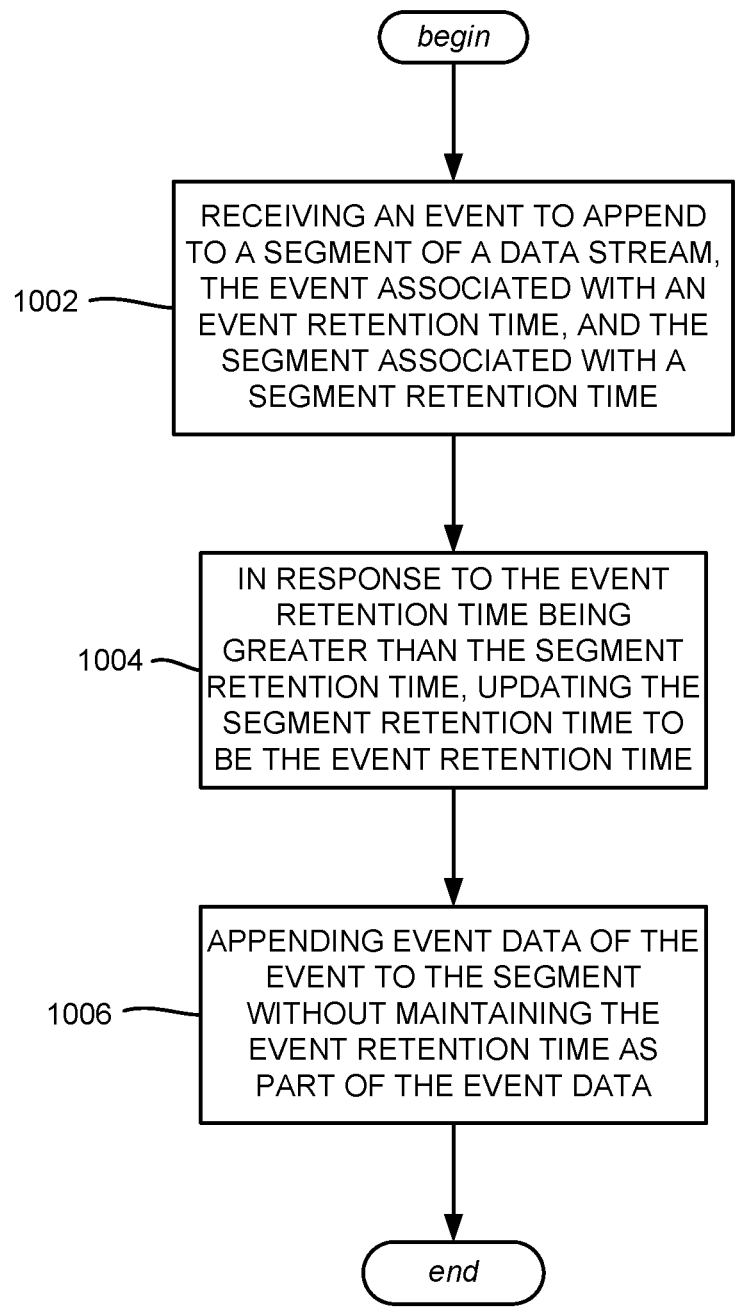
FIG. 10 is a flow diagram showing example operations related to handling an event and data segment with respect to a retention end time for that event, in accordance with various aspects and implementations of the subject disclosure.

FIG. 10 summarizes various example operations, e.g., corresponding to a machine-readable storage medium, comprising executable instructions that, when executed by a processor of a streaming data storage system, facilitate performance of operations. Operation 1002 represents receiving an event to append to a segment of a data stream, the event associated with an event retention time, and the segment associated with a segment retention time. Operation 1004 represents, in response to the event retention time being greater than the segment retention time, updating the segment retention time to be the event retention time. Operation 1006 represents appending event data of the event to the segment without maintaining the event retention time as part of the event data.

Further operations can comprise determining the event retention time based on the current time and a retention period received in conjunction with the event.

The segment of the data stream can be an active segment of a group of respective active segments having respective segment retention times, and further operations can comprise determining a stream cut retention end time based on a largest segment retention end time of the respective segment retention times, and writing a stream cut to an auxiliary stream cut segment associated with the data stream, the stream cut comprising the stream cut retention end time.

Further operations can comprise receiving a request to truncate the data stream, the request associated with the stream cut, obtaining the stream cut retention end time associated with the stream cut, determining whether the stream cut retention end time is ahead of the current time, in response to the stream cut retention end time being determined to be ahead of the current time, blocking the request, and, in response to the stream cut retention end time being determined not to be ahead of the current time, truncating the data stream based on the stream cut.

Further operations can comprise detecting a scaling event that creates a successor segment from a predecessor segment, and for the successor segment, setting the segment retention time to the longer of a retention time of the predecessor segment or a maximum retention time of any event appended to the successor segment As can be seen, described herein is a technology that facilitates data retention management at the event level in stream-based data storage systems. The technology allows more flexible retention management in data streaming platforms. The technology is practical to implement.

Figure 11:
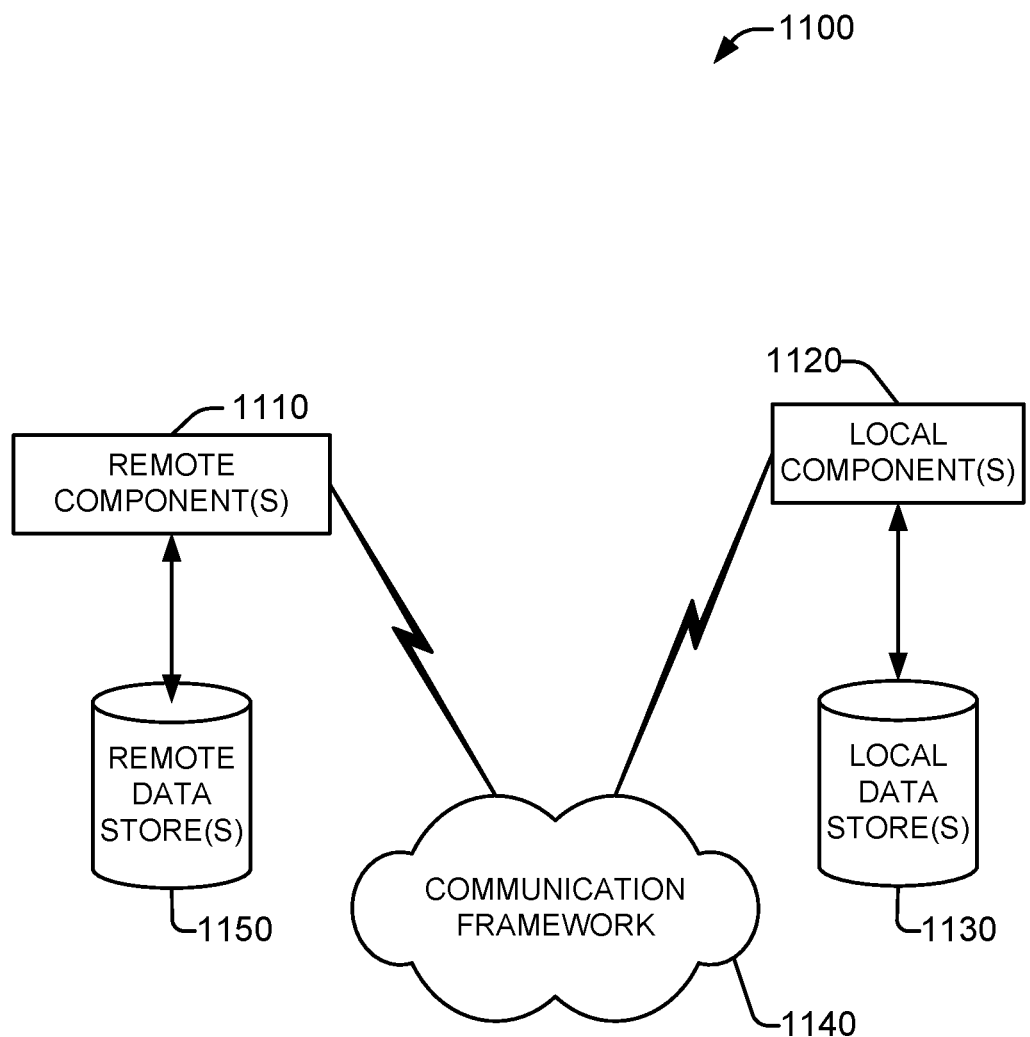
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
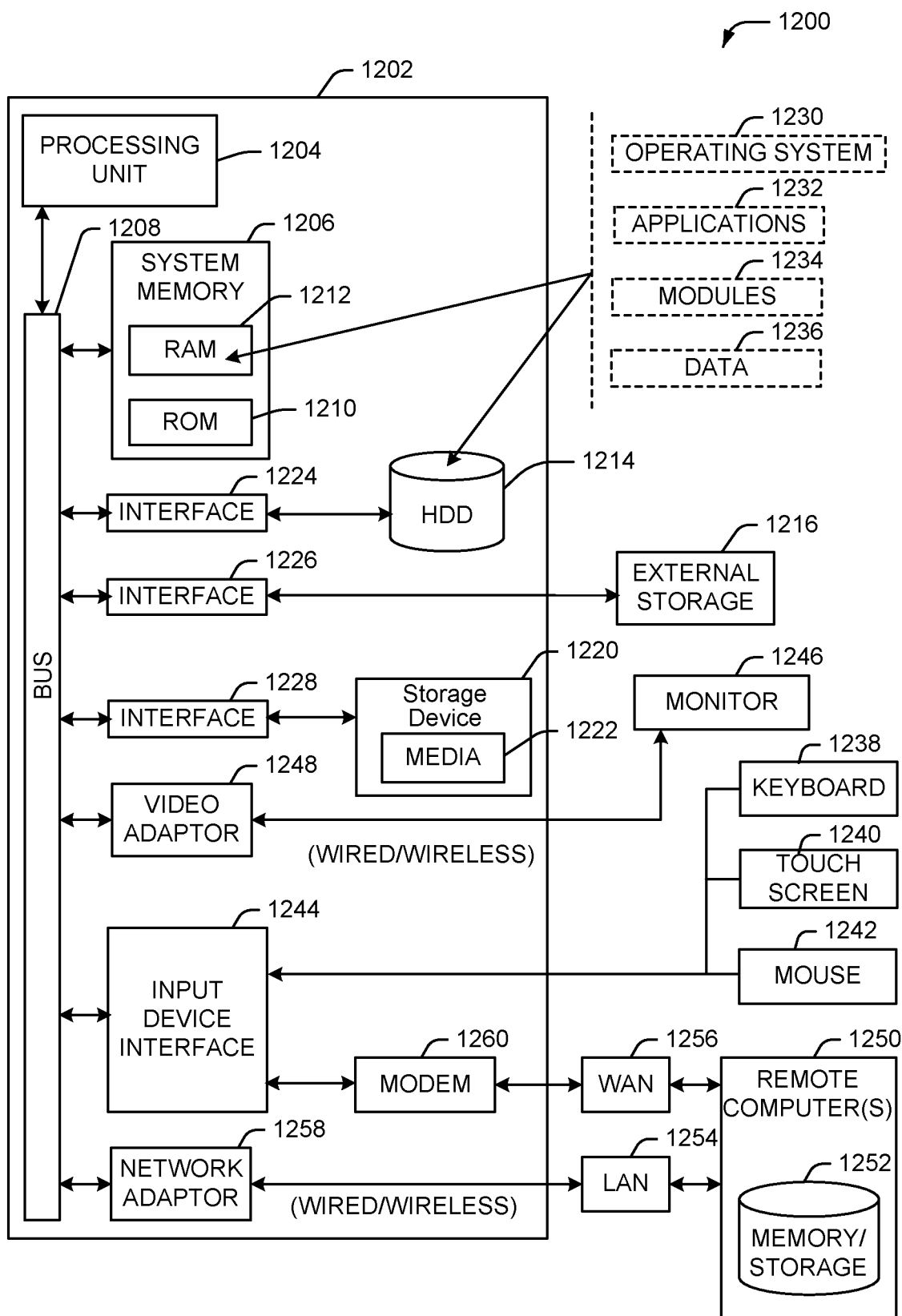
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
      obtaining an event to be appended to a data stream, wherein the event is associated with a routing key and an event retention period, wherein the event retention period defines a minimum amount of time that the event is required to be stored in the data stream before deletion of the event from the data stream;
      determining a segment of the data stream based on the routing key;
      obtaining a segment retention end time associated with the segment, wherein the segment is required to be stored in the data stream at least until the segment retention end time before deletion of the segment from the data stream;
      determining an event retention end time based on the event retention period wherein the event is required to be stored in the data stream at least until the event retention end time before the deletion of the event from the data stream;
      determining whether the event retention end time is greater than the segment retention end time, and in response to the event retention end time being determined to be greater than the segment retention end time, updating the segment retention end time to equal the event retention end time; and
      appending the event to the segment.

2. The system of claim 1, wherein the appending of the event to the segment and the updating of the segment retention end time to equal the event retention end time occur in an atomic operation.

3. The system of claim 1, wherein the segment retention end time is maintained in metadata of a segment store instance associated with the segment.

4. The system of claim 1, wherein the operations further comprise determining a group of active segments associated with the data stream, determining a stream cut retention end time based on which active segment is determined to have a largest segment retention end time, and writing a stream cut to an auxiliary stream cut segment associated with the data stream, the stream cut comprising the stream cut retention end time.

5. The system of claim 4, wherein the stream cut further comprises respective segment identifier, segment offset groupings for respective active segments of the group.

6. The system of claim 4, wherein the operations further comprise receiving a request to truncate the data stream, the request associated with the stream cut, obtaining the stream cut retention end time associated with the stream cut, determining whether the stream cut retention end time is ahead of a current time, and, in response to the stream cut retention end time being determined not to be ahead of the current time, truncating the data stream based on the stream cut.

7. The system of claim 6, wherein the operations further comprise, in response to the stream cut retention end time being determined to be ahead of the current time, blocking the request.

8. The system of claim 1, wherein the operations further comprise detecting a scaling event that creates successor segments from a predecessor segment, and, for each successor segment, setting a successor segment retention end time of the successor segment to the longer of a predecessor segment retention end time of the predecessor segment or a maximum event retention end time of any event appended to the successor segment.

9. The system of claim 1, wherein the operations further comprise detecting a scaling event that merges predecessor segments into a successor segment, and, in response to the scaling event, obtaining a maximum predecessor segment retention end time of the predecessor segments, and setting a successor segment retention end time of the successor segment to the longer of the maximum predecessor segment retention end time or a maximum event retention end time of any event appended to the successor segment.

10. A method comprising:
   determining, by a data streaming data storage system comprising a processor, a group of active segments associated with a data stream;
   appending events to the active segments of the group;
   maintaining, with each active segment, a segment retention end time that is based on respective event retention end times of events appended to the active segment, wherein an event is specified to be stored in the data stream at least until a corresponding event retention end time before deletion of the event from the data stream, and wherein the active segment is specified to be stored in the data stream at least until the segment retention end time before deletion of the active segment from the data stream;

determining a stream cut retention end time based on a largest segment retention end time of the active segments; and writing a stream cut to an auxiliary stream cut segment associated with the data stream, the stream cut comprising the stream cut retention end time.

11. The method of claim 10, wherein the maintaining, with each active segment, the segment retention end time comprises keeping a maximum event retention end time among the events appended to the active segment as the segment retention end time.

12. The method of claim 10, further comprising receiving a request to truncate the data stream, the request associated with the stream cut, obtaining the stream cut retention end time associated with the stream cut, determining whether the stream cut retention end time is ahead of a current time, and, in response to the stream cut retention end time being determined to be ahead of the current time, blocking the request.

13. The method of claim 12, further comprising, in response to the stream cut retention end time being determined not to be ahead of the current time, truncating the data stream based on the stream cut.

14. The method of claim 10, further comprising detecting a scaling event that creates successor segments from a predecessor segment, and for each successor segment, setting a successor segment retention end time of the successor segment to the greater of a predecessor segment retention end of the predecessor segment or a maximum event retention end time of any event appended to the successor segment.

15. The method of claim 10, further comprising detecting a scaling event that merges predecessor segments into a successor segment, and, in response to the scaling event, obtaining a maximum predecessor segment retention end time of the predecessor segments, and setting a successor segment retention end time of the successor segment to the greater of the maximum predecessor segment retention end time or a maximum event retention end time of any event appended to the successor segment.

16. A non-transitory machine-readable medium, comprising executable instructions that, when executed by a processor of a data streaming data storage system, facilitate performance of operations, the operations comprising:

receiving an event to append to a segment of a data stream, the event associated with an event retention end time, and the segment associated with a segment retention end time, wherein the event must be stored in the data stream at least until the event retention end time before deletion of the event from the data stream, and wherein the segment must be stored in the data stream at least until the segment retention end time before deletion of the segment from the data stream;

in response to the event retention end time being greater than the segment retention end time, updating the segment retention end time to be the event retention end time; and appending event data of the event to the segment without maintaining the event retention end time as part of the event data.

17. The non-transitory machine-readable medium of claim 16, wherein the operations further comprise determining the event retention end time based on a current time and an event retention period received in conjunction with the event, wherein the event retention period defines a minimum amount of time that the event must be stored in the data stream before the deletion of the event from the data stream.

18. The non-transitory machine-readable medium of claim 16, wherein the segment of the data stream is an active segment of a group of respective active segments having respective segment retention end times, and wherein the operations further comprise determining a stream cut retention end time based on a largest segment retention end time of the respective segment retention end times, and writing a stream cut to an auxiliary stream cut segment associated with the data stream, the stream cut comprising the stream cut retention end time.

19. The non-transitory machine-readable medium of claim 16, wherein the operations further comprise receiving a request to truncate the data stream, the request associated with a stream cut, obtaining the stream cut retention end time associated with the stream cut, determining whether the stream cut retention end time is ahead of a current time, in response to the stream cut retention end time being determined to be ahead of the current time, blocking the request, and, in response to the stream cut retention end time being determined not to be ahead of the current time, truncating the data stream based on the stream cut.

20. The non-transitory machine-readable medium of claim 16, wherein the operations further comprise detecting a scaling event that creates a successor segment from a predecessor segment, and for the successor segment, setting a successor segment retention end time of the successor segment to the longer of a predecessor segment retention end time of the predecessor segment or a maximum event retention end time of any event appended to the successor segment.

* * * * *